US012558781B2

(12) United States Patent
Nakasu et al.

(10) Patent No.: US 12,558,781 B2
(45) Date of Patent: Feb. 24, 2026

(54) AUTOMATIC MACHINE CONTROL DEVICE AND AUTOMATIC MACHINE CONTROL METHOD

(71) Applicant: Hitachi, Ltd., Tokyo (JP)

(72) Inventors: Nobuaki Nakasu, Tokyo (JP); Kaichiro Nishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 18/540,039

(22) Filed: Dec. 14, 2023

(65) Prior Publication Data

US 2024/0269836 A1     Aug. 15, 2024

(30) Foreign Application Priority Data

Feb. 9, 2023     (JP) ................................. 2023-018313

(51) Int. Cl.
  B25J 9/16          (2006.01)
  B25J 19/02          (2006.01)
(52) U.S. Cl.
  CPC ............. B25J 9/163 (2013.01); B25J 9/1697 (2013.01); B25J 19/023 (2013.01)
(58) Field of Classification Search
  CPC ......... B25J 9/163; B25J 9/1697; B25J 19/023
  See application file for complete search history.

(56) References Cited

U.S. PATENT DOCUMENTS

| | | | | |
|---|---|---|---|---|
| 11,254,003 B1 * | 2/2022 | Zhao | .................... | G05D 1/0217 |
| 2020/0094409 A1 * | 3/2020 | Liu | ........................ | B25J 9/1666 |
| 2021/0001481 A1 * | 1/2021 | Hayashi | ................... | G06N 5/02 |
| 2021/0154842 A1 * | 5/2021 | Lin | ........................ | B25J 9/1676 |
| 2021/0394432 A1 * | 12/2021 | Lalonde | ................ | B29C 64/386 |
| 2022/0143829 A1 * | 5/2022 | Takahashi | .............. | B25J 9/1664 |

FOREIGN PATENT DOCUMENTS

JP          2019-159767 A       9/2019

* cited by examiner

Primary Examiner — Khoi H Tran
Assistant Examiner — Tristan J Greiner
(74) Attorney, Agent, or Firm — Volpe Koenig

(57)          ABSTRACT

A first transition section is set in a first base track and includes a connection point between the first base track and a second base track. A first machine learning model and a second machine learning model are set for the first base track and the second base track, respectively. When the actual track or the predicted track at the predetermined point is within the error range, the control device controls the automatic machine using the first machine learning model set for the first base track in the transition section. When the actual track or the predicted track at the predetermined point is outside the error range, the control device controls the automatic machine in the transition section by a control method different from that of the first machine learning model.

8 Claims, 14 Drawing Sheets

Figure 4:
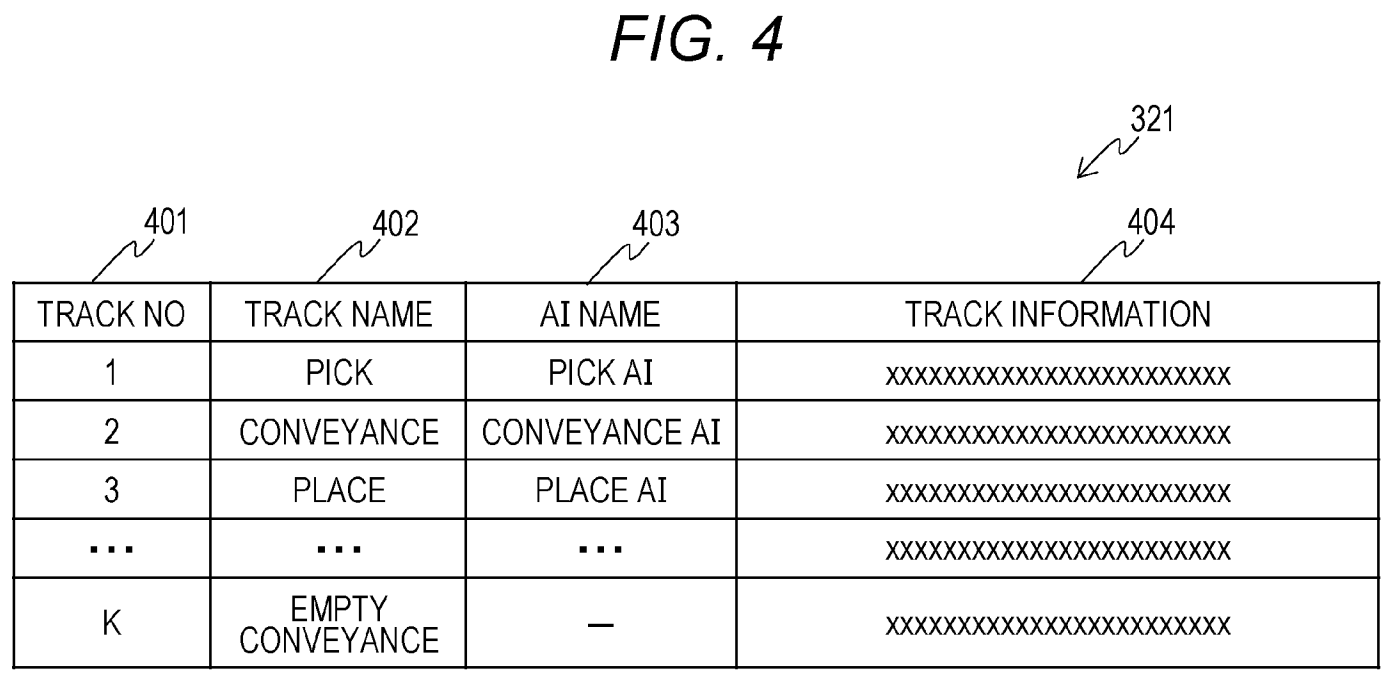

| TRACK NO | TRACK NAME | AI NAME | TRACK INFORMATION |
|----------|-----------|---------|-------------------|
| 401 | 402 | 403 | 404 |
| 1 | PICK | PICK AI | xxxxxxxxxxxxxxxxxxxxxxxxxxx |
| 2 | CONVEYANCE | CONVEYANCE AI | xxxxxxxxxxxxxxxxxxxxxxxxxxx |
| 3 | PLACE | PLACE AI | xxxxxxxxxxxxxxxxxxxxxxxxxxx |
| ... | ... | ... | xxxxxxxxxxxxxxxxxxxxxxxxxxx |
| K | EMPTY CONVEYANCE | — | xxxxxxxxxxxxxxxxxxxxxxxxxxx |

| No | $\theta1$ | $\theta2$ | $\theta3$ | $\theta4$ | $\theta5$ | $\theta6$ |
|------|------|------|------|------|------|------|
| k−1 | 90 | 86 | 0 | 29 | 45 | 180 |
| k−2 | 90.5 | 86 | 0 | 29 | 44.5 | 175 |
| k−3 | 90 | 86 | 1 | 29 | 44.3 | 170 |
| ... | | | | | | |
| K−M | 60 | 86 | 1.1 | 29 | 44 | 100 |

| TRACK NO | TRACK NAME | AI NAME | PREVIOUS TRANSITION SECTION | | | REAR TRANSITION SECTION | | |
| --- | --- | --- | --- | --- | --- | --- | --- | --- |
| 501 | 502 | 503 | 504 | | | 505 | | |
| | | | SECTION LENGTH (511) | ALLOWABLE ERROR (512) | TRACK TYPE (513) | SECTION LENGTH (521) | ALLOWABLE ERROR (522) | TRACK TYPE (523) |
| 1 | PICK | PICK AI | — | — | — | — | — | — |
| 2 | CONVEYANCE | CONVEYANCE AI | 30mm | 1mm | SYNTHETIC AI | 40mm | ONCE | ASYMPTOTIC |
| 3 | PLACE | PLACE AI | — | — | — | 20mm | 100deg/sec | TEMPORARY STOP |
| ⋮ | ⋮ | ⋮ | ⋮ | ⋮ | ⋮ | ⋮ | ⋮ | ⋮ |
| K | EMPTY CONVEYANCE | — | — | — | — | — | — | — |

PLANNED TRACK DISPLAY BUTTON | ACTUAL TRACK DISPLAY BUTTON

→ PLANNED
- - → ACTUAL

TRACK DATA INPUT BUTTON

_850_

RESULT _830_

| TRACK No | PREVIOUS TRANSITION SECTION | | | REAR TRANSITION SECTION | | |
|---|---|---|---|---|---|---|
| | ERROR PREDICTED VALUE | ERROR MEASURED VALUE | PAUSE TIME | ERROR PREDICTED VALUE | ERROR MEASURED VALUE | PAUSE TIME |
| 1 | — | — | — | — | — | — |
| 2 | 1.8mm | 1.5mm | 0.3sec | 0.6deg | 0.5deg | — |
| 3 | — | — | — | 80deg/sec | 120deg/sec | 2.5sec |
| ... | — | — | — | ... | ... | ... |
| K | — | — | — | — | — | — |

DESIGNATED PARAMETER _810_

| TRACK No | TRACK NAME | AI NAME | PREVIOUS TRANSITION SECTION | | | REAR TRANSITION SECTION | | |
|---|---|---|---|---|---|---|---|---|
| | | | SECTION LENGTH | ALLOWABLE ERROR | CORRECTION TYPE | SECTION LENGTH | ALLOWABLE ERROR | CORRECTION TYPE |
| 1 | PICK | PICK AI | — | — | — | — | — | — |
| 2 | CONVEYANCE | CONVEYANCE AI | 30mm | 1mm | SYNTHETIC AI | 40mm | ONCE | ASYMPTOTIC |
| 3 | PLACE | PLACE AI | — | — | — | 20mm | 100deg/sec | TEMPORARY STOP |
| ... | ... | ... | — | — | — | ... | ... | ... |
| K | EMPTY CONVEYANCE | — | — | — | — | — | — | — |

AUTOMATIC MACHINE CONTROL DEVICE AND AUTOMATIC MACHINE CONTROL METHOD

CLAIM OF PRIORITY

The present application claims priority from Japanese patent application JP 2023-018313 filed on Feb. 9, 2023, the content of which is hereby incorporated by reference into this application.

BACKGROUND OF THE INVENTION

1. Field of the Invention

The present invention relates to a control technique for an automatic machine.

2. Description of the Related Art

A robot (automatic machine) can perform various works by changing a program. In recent years, with the progress of artificial intelligence (AI) technology using machine learning, solutions using AI technology have been proposed also in the manufacturing industry. For example, a heavy object conveyance AI that conveys a heavy object without shaking in consideration of inertial force and an insertion AI that assembles a component to a housing have been developed.

As a background art of the present disclosure, there is JP 2019-159767 A. JP 2019-159767 A discloses "Included are: a first calculation unit that performs a calculation relating to predetermined processing using a first model in which a correspondence relationship between input data and output data fluctuates by performing machine learning using learning data for input data, and outputs a first output; a second calculation unit that performs a calculation relating to predetermined processing using a second model in which the correspondence relationship between input data and output data is fixed for the input data, and outputs a second output; and a comparison unit that outputs the first output, the second output, or a third output obtained by combining the first output and the second output on the basis of a comparison result obtained by comparing the first output and the second output with a predetermined determination criterion." (abstract). JP 2019-159767 A is a method in which a track is divided into a plurality of sections, and learned AI and a fixed formula are appropriately switched in each section.

SUMMARY OF THE INVENTION

In JP 2019-159767 A, the AI control is not an operation that guarantees all physical quantities such as the position at the end point and the speed, acceleration, and force during the operation. Therefore, the end point condition of the current track may not match the start point condition of the connected next track. In a case where different AIs are used in the connected track, if the control law of the AI is greatly different, the behavior of the robot becomes unstable when the AI is switched at a connection point. In order to solve this problem, if a method for removing uncertainty caused by AI is applied by temporarily stopping at the connection point, sufficiently settling, and then transitioning to the next track, the operation is delayed. Therefore, a technique capable of stably switching the track control of the robot is desired.

One aspect of the present disclosure is a control device for an automatic machine, including: one or more processors;

and one or more storage devices, in which the one or more storage devices store base track information for managing a base track, and transition section information for managing a transition section, the base track information includes information of each of a first base track and a second base track that are continuous, the base track information designates a first machine learning model set with respect to the first base track, the base track information designates a second machine learning model set with respect to the second base track, the transition section information designates a first transition control method of the automatic machine in a first transition section different from control by the first machine learning model, the first transition section is set in the first base track and includes a connection point between the first base track and the second base track, and the one or more processors determine whether an actual track or a predicted track of the automatic machine at a predetermined point is within a preset error range, control the automatic machine using the first machine learning model in the transition section when the actual track or the predicted track is within the error range, and control the automatic machine by the first transition control method in the transition section when the actual track or the predicted track is outside the error range.

According to one aspect of the present disclosure, an automatic machine can be appropriately controlled. Problems, configurations, and effects other than those described above will be clarified by the following description of embodiments.

BRIEF DESCRIPTION OF THE DRAWINGS

FIG. 1 illustrates a configuration of a robot system according to an embodiment of the present specification;

FIG. 4 illustrates an example of base track information;

FIG. 5 illustrates an example of track information of a k-th base track included in a track information field;

FIG. 6 illustrates a configuration example of transition section information;

FIG. 8A illustrates a flowchart of an example of control processing of the robot by the control device;

FIG. 13 illustrates an example of a setting screen of a transition section.

DESCRIPTION OF THE PREFERRED EMBODIMENTS

Figure 2:
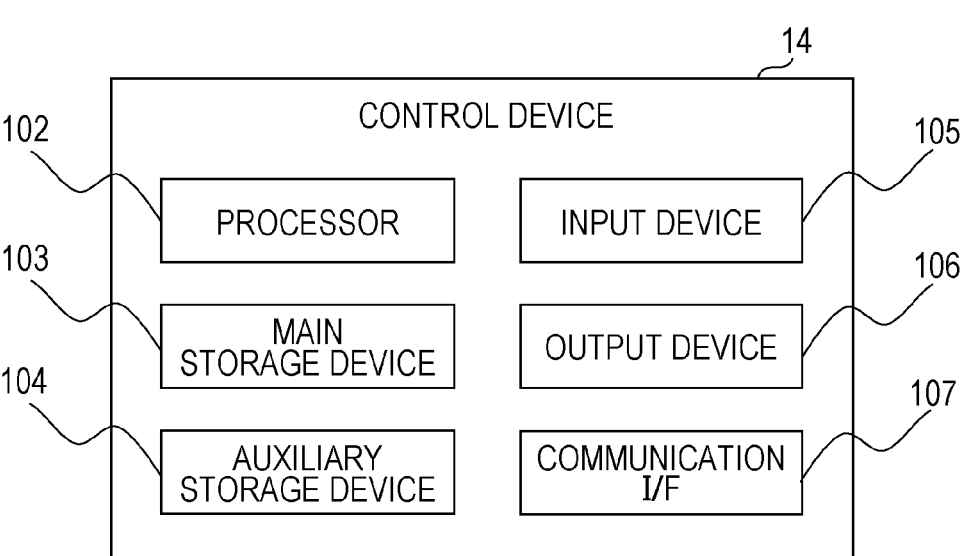
FIG. 2 illustrates a hardware configuration example of a control device.

Hereinafter, embodiments of the present specification will be described in detail with reference to the drawings. For convenience, when necessary, the description will be divided into a plurality of sections or embodiments, but unless otherwise specified, they are not unrelated to each other, and one is in a relationship of some or all modifications, details, supplementary explanation, and the like of the other. Furthermore, in the following description, when referring to the number of elements and the like (including number, numerical value, amount, range, and the like), the number is not limited to a specific number unless otherwise specified or clearly limited to the specific number in principle.

An embodiment of the present specification provides a technique for suppressing unstable behavior of a robot (automatic machine) in switching of a control model of the robot. At the connection point of the base track (planned track), the state (physical quantity) of the robot may be discontinuous unintentionally. The state includes a stationary state such as coordinates and a moving state such as speed and acceleration. In particular, when using different AI models in the respective base tracks, the robot is likely to exhibit unstable behavior due to the discontinuity of the robot state. In one embodiment of the present specification, the unstable behavior of the robot due to the control model switching of the base track is suppressed by setting the transition section in the base track.

Figure 1:
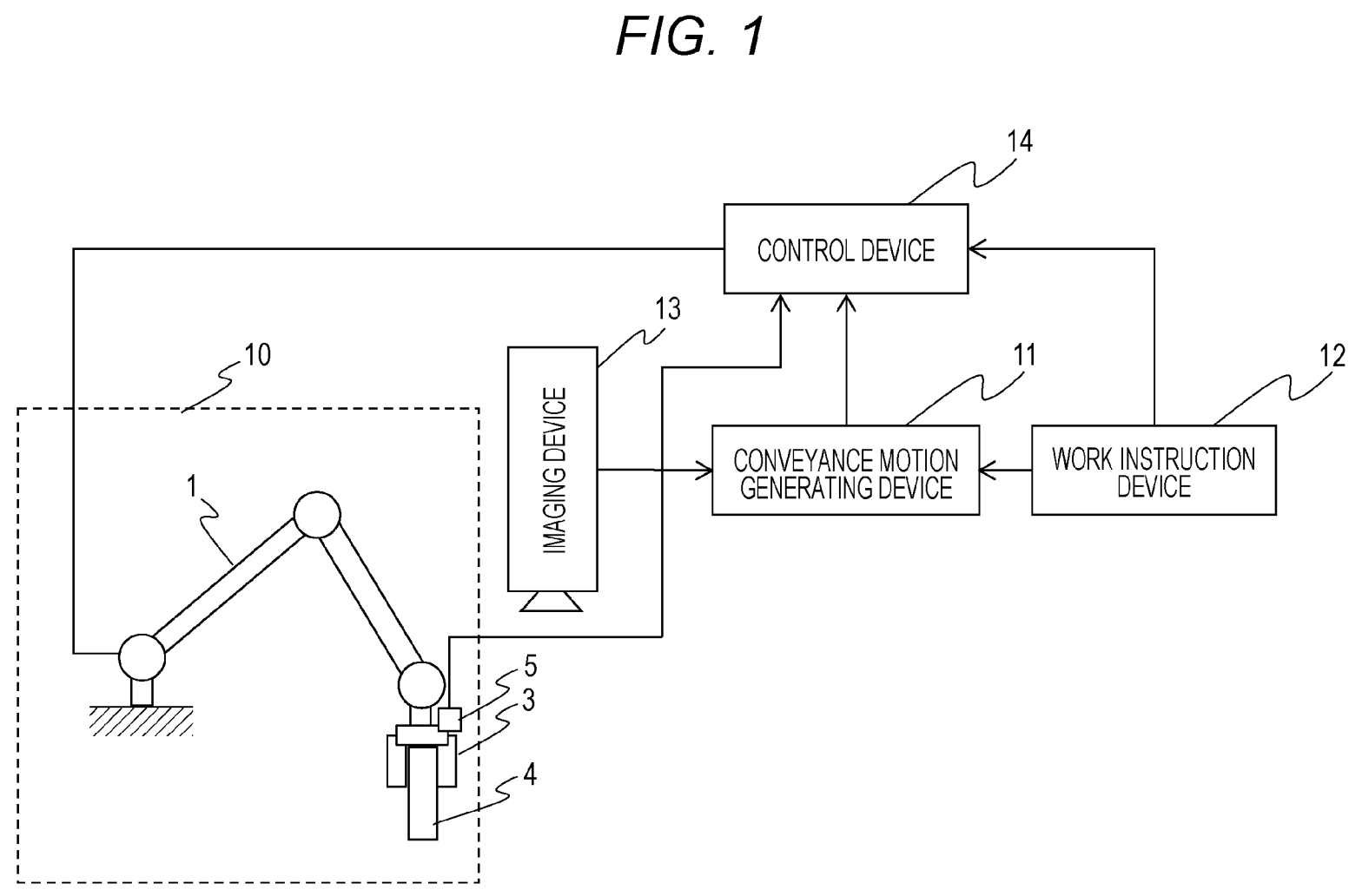

FIG. 1 illustrates a configuration of a robot system according to an embodiment of the present specification. The robot system includes a robot 10, a conveyance motion generating device 11, a work instruction device 12, an imaging device 13, and a control device 14.

The robot 10 moves an article (gripped object) 4 from a start point to an end point according to a control signal input from the control device 14. The robot 10 includes a plurality of links (arms) 1 and a hand 3 that grips the article 4. In FIG. 1, one link is indicated by reference numeral 1 as an example.

The plurality of links 1 are connected via a joint including a drive motor. The hand 3 is attached to the distal end of one link 1 via a joint, and can grip the article 4. The robot 10 can move the hand 3 by driving the drive motor of each joint according to the control signal from the control device 14. In addition, the robot 10 always generates robot state information including the angle, the angular velocity, the angular acceleration, the drive motor torque, the drive motor current value of each joint, and the distance to the end point, and outputs the robot state information to the control device 14.

Various sensors can be mounted in the robot 10. FIG. 1 illustrates one sensor 5 as an example. Examples of the mounted sensor include a force sensor, a speed sensor, and an acceleration sensor. The force sensor can measure the force applied to the hand 3 and output the measured force to the control device 14. The acceleration sensor and the speed sensor can measure the acceleration of the hand 3 or the article 4 and output the measured acceleration to the control device 14. Note that the number of links, the number of axes, and the operation mechanism of the robot 10 are not limited to the illustrated example and are arbitrary.

The work instruction device 12 gives a work instruction to the conveyance motion generating device 11 on the basis of the input from the user. For example, the work instruction device 12 passes information of a plurality of tracks (partial tracks) constituting the entire track followed by the article from the start point to the end point to the conveyance motion generating device 11. The information of each track may include information of a track number, a track name, a track generation algorithm number, an AI name used for robot control, a start point of the track, and an end point of the track. Some of these pieces of information may be omitted, and other pieces of information may be added.

The conveyance motion generating device 11 determines a base track indicating a basic movement path of the hand 3 in the work of moving the article 4 from the start point to the end point on the basis of the work instruction from the work instruction device 12. The base track is determined for each of a plurality of successive tracks from a start point to an end point. The base track indicates coordinates of the reference point, a moving speed, and the like. The base track information indicating the base track is output to the control device 14. The base track determined here can move the hand 3 from a start point to an end point, but is not necessarily an actual path for moving various articles 4.

The work instruction device 12 passes the information on the transition section to the control device 14 on the basis of the input from the user. The information on the transition section is referred to for control of the robot by the control device 14. The information on the transition section includes information on one or more transition sections of the selected track. Details of the information on the transition section will be described later.

The imaging device 13, which is one of the sensors, captures an image of the robot 10 moving the article 4 and the surroundings, analyzes the captured image obtained as a result, generates information of the article 4 including the position, speed, acceleration, and the like of the article 4 and information of the surroundings, and outputs the information to the control device 14. However, a captured image may be output from the imaging device 13 to the control device 14, and the control device 14 may analyze the captured image to generate article information and surrounding information.

The control device 14 generates control information for the robot 10 on the basis of the base track information generated by the conveyance motion generating device 11, the robot state information from the robot 10, and information of various sensors including the imaging device 13 and the sensor 5. The control information generated here can include, for example, the next target angle, angular velocity, and angular acceleration of each joint of the robot 10, the torque and drive current of the drive motor of each joint, or the next target coordinate, speed, acceleration and the like of the article 4.

FIG. 2 illustrates a hardware configuration example of the control device 14. The conveyance motion generating device 11 and the work instruction device 12 can have a similar configuration. The control device 14 includes a processor 102, a main storage device 103, an auxiliary storage device 104, an input device 105, an output device 106, and a communication interface 107. Each part of the control device 14 is communicably connected to each other via communication means such as a bus (not illustrated). Note that all or a part of the configuration of the control device 14 may be realized by a virtual resource such as a cloud server.

The processor 102 is configured using a central processing unit (CPU), a micro processing unit (MPU), a graphics processing unit (GPU), or the like. The processor 102 reads and executes the program stored in the main storage device 103, thereby implementing the functions included in each device of the control device 14.

The main storage device 103 is a device that stores programs and data, and is a read only memory (ROM), a random access memory (RAM), a non volatile RAM (NVRAM), or the like.

The auxiliary storage device 104 is, for example, a solid state drive (SSD), an NVRAM such as an SD memory card, an optical storage device such as a compact disc (CD) or a digital versatile disc (DVD), a hard disc drive (HDD), a storage area of a cloud server, or the like. The auxiliary storage device 104 includes a non-transitory storage medium that stores programs and data. The programs and data stored in the auxiliary storage device 104 are read into the main storage device 103 as needed.

The input device 105 is an interface that receives input of information, and is, for example, a keyboard, a mouse, a touch panel, a card reader, a microphone, or the like. Alternatively, the control device 14 may be configured to receive an input of information from another device, for example, the work instruction device 12 via some communication means.

The output device 106 is an interface that outputs various types of information, and is, for example, a screen display device such as a liquid crystal monitor, a liquid crystal display (LCD), or a graphic card, or an audio output device such as a printing device or a speaker. Alternatively, the control device 14 may be configured to output information with another device via some communication means. The communication interface 107 is a device for the control device 14 to communicate with another device, for example, the work instruction device 12. Some of the components shown in FIG. 2 can be omitted, and other components can be added.

The control device 14 can be configured by one or a plurality of computers. As described above, the control device 14 can include one or more processors and one or more arithmetic devices. One or more processors operate as a predetermined functional unit by executing a program stored in one or more storage devices.

Figure 3:
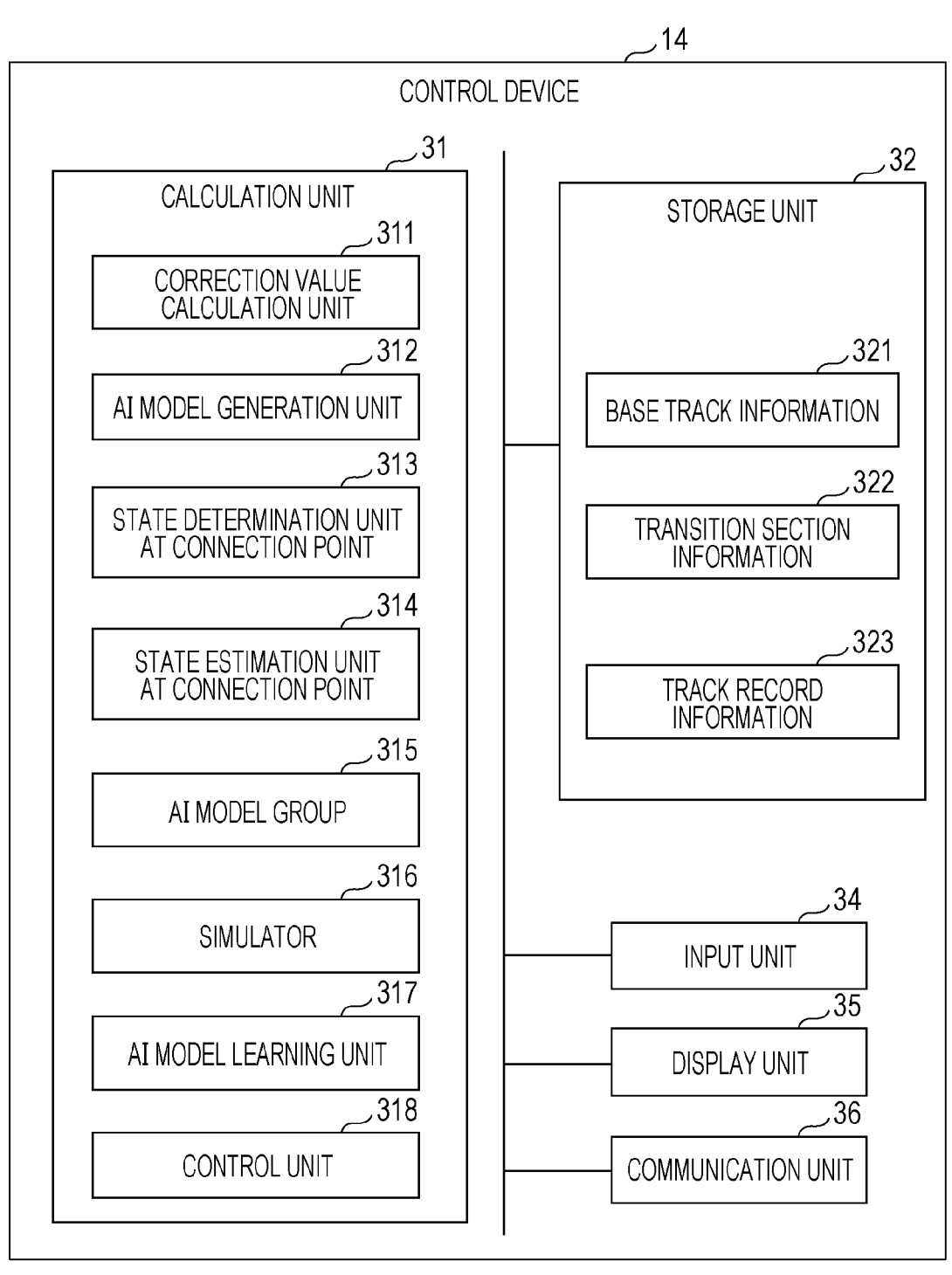
FIG. 3 is a block diagram illustrating an example of a functional configuration of a control device according to an embodiment of the present specification.

FIG. 3 is a block diagram illustrating an example of a functional configuration of the control device 14 according to an embodiment of the present specification. A calculation unit 31 integrally controls the entire control device 14. The calculation unit 31 includes a correction value calculation unit 311, an AI model generation unit 312, a state determination unit 313 at a connection point, a state estimation unit 314 at a connection point, an AI model group 315, a simulator 316, an AI model learning unit 317, and a control unit 318. Each functional unit of the calculation unit 31 can be realized, for example, by the processor 102 executing a corresponding program. The input unit 34, the display unit 35, and the communication unit 36 can be realized by the processor 102 operating in cooperation with the input device 105, the output device 106, and the communication interface 107.

A storage unit 32 stores information required for the operation of the control device 14. The storage unit 32 includes a main storage device 103 and an auxiliary storage device 104. The storage unit 32 stores transition section information 322, base track information 321, and track record information 323. In addition, the storage unit 32 is used as a work area of the calculation unit 31, the correction value calculation unit 311 realized by the calculation unit 31, and the like.

The base track information 321 stores information of each base track constituting the entire track in the conveyance of the article 4. The base track information 321 is generated by the conveyance motion generating device 11 according to an instruction from the work instruction device 12. The base track information 321 is stored in the storage unit 32 via the communication unit 36.

The transition section information 322 stores information on the transition section in the conveyance of the article 4. The transition section is defined in each track selected from the entire track. One or a plurality of transition sections can be set in each track selected by the user. The control device 14 generates the transition section information 322 for managing information on the designated transition section in accordance with the user input received via the work instruction device 12.

On the basis of the base track information 321, the transition section information 322, and the state information obtained from the robot 10 and/or the sensors 5 and 13, the correction value calculation unit 311 calculates a correction value for the base track in real time so that the hand 3 of the robot 10 moves the article 4 through the optimum track.

The correction value calculation unit 311 uses an AI model (machine learning model) selected from the AI model group 315 or an AI model generated by the AI model generation unit 312 for calculation of the correction value. The AI model can be realized by, for example, a neural network. Note that the AI model is not limited to the neural network, and a machine learning model having another configuration may be used.

The AI model generation unit 312 generates the AI model used in the transition section using the AI model of the AI model group 315. The state determination unit 313 at the connection point performs determination processing of the state of the robot 10 at the connection point between the transition section and the next section.

The state estimation unit 314 at the connection point estimates an error between the base track and the estimation point at the connection point between the transition section and the next section. The state estimation unit 314 at the connection point calculates an error estimation value using the simulator 316. The simulator 316 executes a simulation of the operation of the robot 10. This enables accurate error estimation. Note that the error estimation value may be calculated by a model different from the simulator.

The AI model learning unit 317 executes training of the AI model group 315. The training data can include data of actual control of the robot 10, for example, can include samples in which control by the AI model indicated operation outside of a target range. The control unit 318 generates a control signal for controlling the robot 10 according to the base track information 321 and the correction value calculated by the correction value calculation unit 311, and outputs the control signal to the robot 10 via the communication unit 36.

FIG. 4 illustrates an example of the base track information 321. In the configuration example illustrated in FIG. 4, the base track information 321 includes a track number field 401, a track name field 402, an AI name field 403, and a track information field 404. The track number field 401 uniquely identifies each base track (partial base track) and stores a sequence number indicating the order of the track. The track name field 402 indicates a type of operation of the robot 10 on each base track.

The AI name field 403 indicates AI used for controlling the robot 10 with respect to the base track indicated by the track number field 401. The track information field 404 indicates information on a state change of the robot 10 in time series in each base track indicated by the track number. The track information field 404 indicates a via-point of each of the continuous base tracks. The via-point includes a start point, an end point, and points therebetween.

The track number field 401, the track name field 402, and the AI name field 403 store values designated by the user. The information in the track information field 404 is generated and stored by the conveyance motion generating device 11. For example, the conveyance motion generating device 11 acquires information of a start point and an end point of each base track from the user via the work instruction device 12, calculates a base track connecting the start point and the end point, and stores the base track in the track information field 404. Here, the end point and the start point of the continuous base tracks coincide with each other and are connection points thereof.

FIG. 5 illustrates an example of the track information 410 of the k-th base track included in the track information field 404. k is an arbitrary natural number. Each record indicates a sequence of M arrays of angles of joints of the robot 10 (corresponding to via-points in the base track) for each certain period of time. M is a natural number. The certain period of time is, for example, several milliseconds. A via-point number field 411 uniquely identifies the array of joint angles and indicates the order of via-points in the sequence. The example illustrated in FIG. 5 illustrates an angle array (joint angle combination) including six joint angles. The fields 412 to 417 store values of joint angles $\theta 1$ to $\theta 6$, respectively.

As illustrated in FIG. 5, the track information 410 indicates information on the position and change of the via-point in the base track. As illustrated in FIG. 5, the track information 410 may be represented by a sequence of joint angles, or may be represented by a sequence of Cartesian coordinates of a specific position. The track information field 404 may be designated using a part of the position, the velocity, the acceleration, the angular velocity, the angular acceleration, and the like. Note that, various methods of calculating the base track according to the work, configuration, and ambient environment of the robot 10 are known, and detailed description is omitted herein.

FIG. 6 illustrates a configuration example of the transition section information 322. The transition section information 322 manages information of the transition section set for each track selected from the plurality of tracks indicated by the base track information. One or more transition sections can be set for each selected track. In an embodiment of the present specification, one or two transition sections can be set for the track.

The control device 14 can control the operation of the robot 10 using a model (also a function) different from the non-transition section in the track in which the transition section is set in the transition section. The control device 14 can use, in a certain transition section, a model that is always different from the non-transition section of a track in which the certain transition section is set, and can use, in another certain transition section, a model that is different from the non-transition section in a case where a predetermined condition is satisfied. The transition section can suppress unstable operation in the continuous tracks controlled by the different AI models.

In the configuration example illustrated in FIG. 6, the transition section information 322 includes a track number field 501, a track name field 502, an AI name field 503, a previous transition section field 504, and a rear transition section field 505. The track number field 501, the track name field 502, and the AI name field 503 indicate the same information as the track number field 401, the track name field 402, and the AI name field 403 of the base track information 321, respectively.

The previous transition section field 504 stores information on the previous transition section set for the track. The rear transition section field 505 stores information on the rear transition section set for the track. The transition section is set for the track designated by the user. The previous transition section and/or the rear transition section may be set for a certain part of the tracks, and any transition section may not be set for another part of the tracks.

Figure 7:
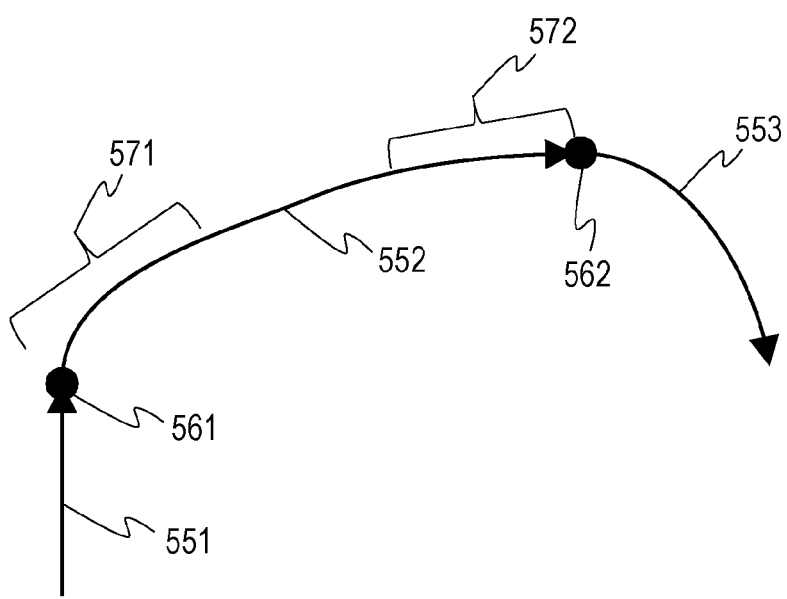
FIG. 7 is a schematic diagram for explaining a previous transition section and a rear transition section.

FIG. 7 is a schematic diagram for explaining the previous transition section and the rear transition section. Three base tracks 551, 552, and 553 are connected. The track number of the base track 551 is 1, the track number of the base track 552 is 2, and the track number of the base track 553 is 3. The intermediate base track 552 is defined between a start point 561 (connection point) and an end point 562 (connection point). For the base track 552, a previous transition section 571 and a rear transition section 572 are set.

The previous transition section 571 is a transition section on the front side (start point side) of the base track 552, and the start point of the previous transition section 571 is the start point 561 of the target base track 552. The rear transition section 572 is a transition section on the rear side (end point side) of the base track 552, and the end point of the rear transition section 572 is the end point 562 of the target base track 552. The start point of the rear transition section 572 and the end point of the previous transition section 571 are separated from each other, and the section therebetween is a non-transition section.

Returning to FIG. 6, the previous transition section field 504 includes a section length field 511, an allowable error field 512, and a track type field 513. The rear transition section field 505 includes a section length field 521, an allowable error field 522, and a track type field 523. The information stored in the previous transition section field 504 and the rear transition section field 505 is information designated by the user via the work instruction device 12.

The section length fields 511 and 521 indicate a section length of the transition section in the base track. As described with reference to FIG. 7, since the start point of the previous transition section coincides with the start point of the base track, the section length defines the end point of the previous transition section. In addition, since the end point of the rear transition section coincides with the end point of the base track, the section length defines the start point of the rear transition section.

The allowable error fields 512 and 522 indicate allowable values for errors from a reference value at the connection point between the transition section and the previous or next section. The reference value may be the base track itself or a value based on the base track generated from the base track. As will be described later, the error at the connection point on the previous side of the transition section is an actual value, and the error at the connection point on the rear side is an estimated value (predicted value). The allowable error can be represented by various types of values. For example, the allowable error can be represented by coordinates, speed, acceleration, angular velocity, angular acceleration, load, and the like.

As described later, when the error is within the allowable error, control based on the AI model associated with the base track is executed instead of the control specific to the transition section. The AI model associated with the base track is shown in the AI name field 403 of the base track information 321.

The track type fields 513 and 523 indicate models (functions) used in the transition section. The model used in the transition section may be either a machine learning model or a rule based model. Note that, in the present example, the transition section is set according to the designation of the user. In another example, the control device 14 may define the transition section according to a preset rule.

Figure 8A:
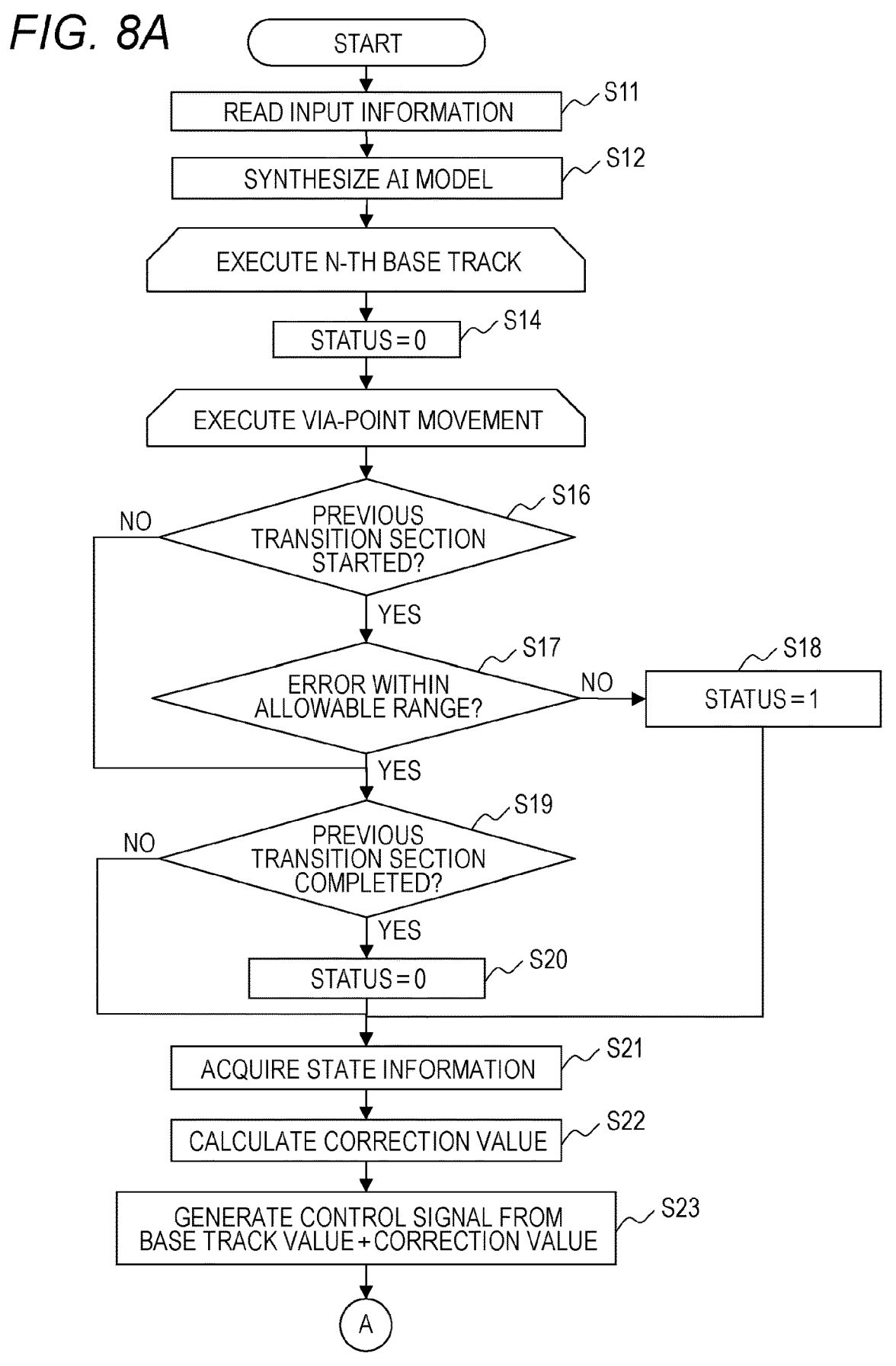
Figure 8B:
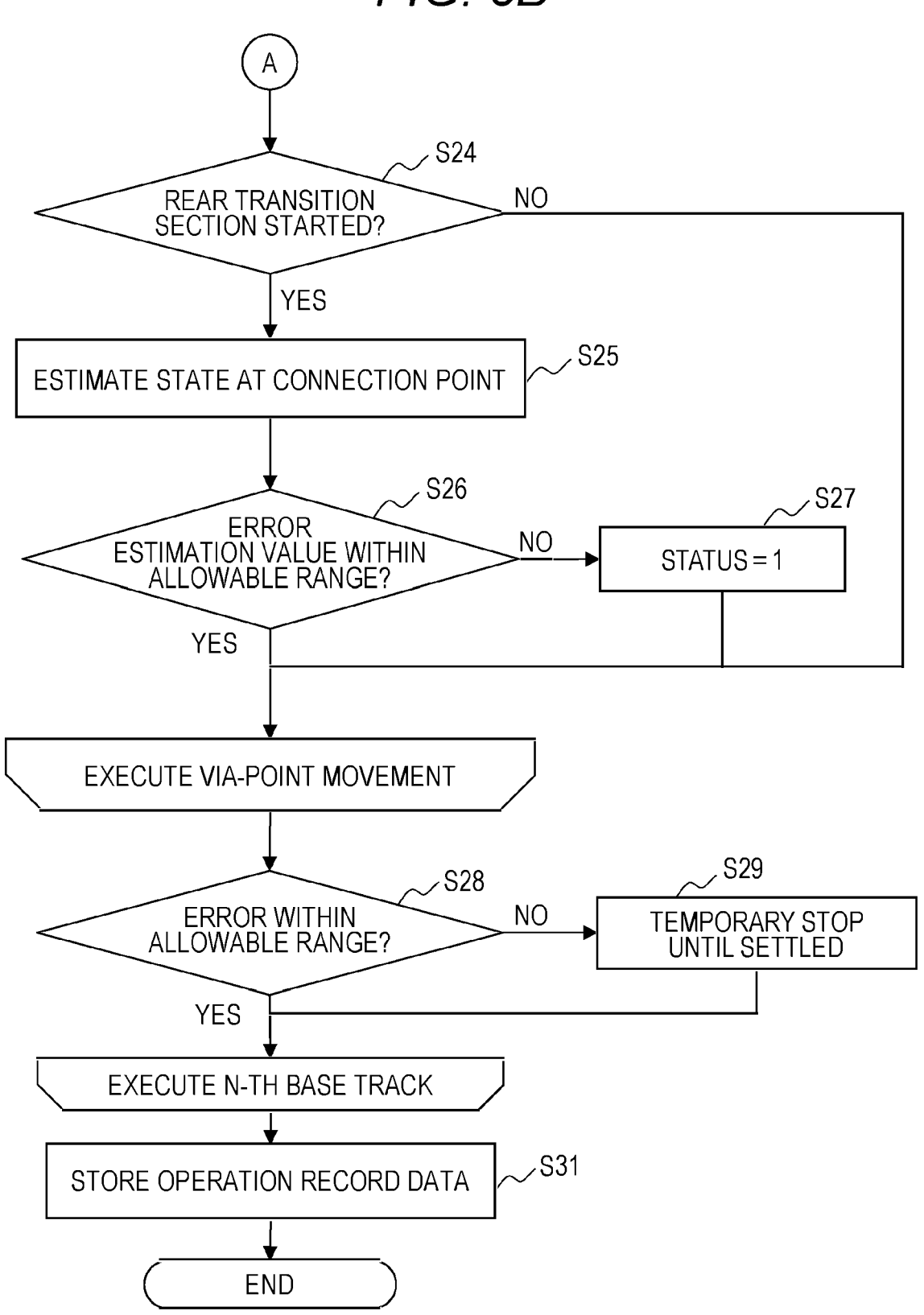
FIG. 8B illustrates a flowchart of an example of control processing of the robot by the control device.

Hereinafter, processing of the control device 14 will be described. FIGS. 8A and 8B are flowcharts of examples of control processing of the robot 10 by the control device 14. Referring to FIG. 8A, in step S11, the calculation unit 31 reads information necessary for operation control of the robot 10 from the input information input from the conveyance motion generating device 11 and the work instruction device 12 and stored in the storage unit 32. The read information includes the base track information 321 and the transition section information 322.

Next, in step S12, the AI model generation unit 312 refers to the transition section information 322, and in a case where there is a transition section whose track type indicates "synthetic AI", generates a synthetic AI model from the AI model selected from the AI model group 315 according to a predetermined method.

Next, the calculation unit 31 executes robot control based on the base track in the order of the track numbers indicated by the base track information 321. The calculation unit 31 executes steps S14 to S29 for each base track. The N-th base track means a base track of an arbitrary track number indicated by the base track information 321.

In step S14, the calculation unit 31 substitutes 0 for the variable STATUS. The variable STATUS is a variable indicating whether or not the control specific to the transition section is executed. In order to move to the next via-point of the current base track (N-th base track), the calculation unit 31 performs steps S16 to S27 at each via-point of the current base track.

In step S16, the correction value calculation unit 311 refers to the transition section information 322 to determine whether the current via-point corresponds to the start point of the previous transition section. Specifically, when the transition section information 322 defines the previous transition section with respect to the current base track and the current via-point corresponds to the start point of the current base track, the transition section starts. The actual track is determined based on the base track and the correction value of the correction value calculation unit 311. The actual via-point can deviate from the via-point of the base track. Since the correction value calculation unit 311 calculates the correction value with reference to the base track, the actual via-point and the via-point of the base track are associated with each other.

In a case where the current via-point is not the start point of the previous transition section (S16: NO), the flow proceeds to step S19. In a case where the current via-point is the start point of the previous transition section (S16: YES), in step S17, the correction value calculation unit 311 determines whether the error of the predetermined value at the current via-point (current state) is within the allowable range. The target for calculating the error and the allowable range of the error value are indicated in the allowable error field 512 of the transition section information. The type of error is defined for each transition section, and can be, for example, a position of a predetermined point of the article 4 or the hand 3, a speed or acceleration thereof, or an angle, an angular velocity, an angular acceleration, or the like from a reference posture of the article 4 or the hand.

In a case where the error is outside the allowable range (S17: NO), in step S18, the correction value calculation unit 311 substitutes 1 for the variable STATUS. Thereafter, the flow proceeds to step S21. In a case where the error is within the allowable range (S17: YES), in step S19, the correction value calculation unit 311 determines whether the current position is the end point of the previous transition section. The correction value calculation unit 311 refers to the transition section information 322 to determine the end point of the previous transition section on the base track, and compares the end point with the via-point of the base track corresponding to the current via-point.

In a case where the current via-point is the end point of the previous transition section (S19: YES), in step S20, the correction value calculation unit 311 substitutes 0 for the variable STATUS. Thereafter, the flow proceeds to step S21. In a case where the current via-point is not the end point of the previous transition section (S19: NO), the flow proceeds to step S21.

In step S21, the correction value calculation unit 311 acquires current state information. The state information can include state information of the robot input from the robot 10, and state information of the article 4 and the surroundings input from the sensor 5 and the imaging device 13. The state information referred to for the correction value calculation is set in advance and depends on the design of the correction value calculation unit 311.

In step S22, the correction value calculation unit 311 calculates a correction value from the next via-point of the base track on the basis of the acquired state information, base track information 321, and transition section information 322. Details of a method of calculating the correction value by the correction value calculation unit 311 will be described later.

In step S23, the control unit 318 generates a control signal to the robot 10 using a value obtained by adding the value of the via-point in the base track indicated by the base track information 321 and the correction value as the next target via-point, and instructs the robot 10 to move to the next via-point.

In step S24, the control unit 318 refers to the transition section information 322 to determine whether the current via-point is the start point of the rear transition section (the connection point on the previous side of the transition section). Specifically, the control unit 318 determines whether the current via-point corresponds to the start point of the rear transition section from the via-point of the base track corresponding to the current via-point and the information on the start point of the rear transition section indicated by the transition section information 322. In a case where the current via-point does not correspond to the start point of the rear transition section (S24: NO), the flow returns to step S16.

In a case where the current via point corresponds to the start point of the transition section (S24: YES), the state estimation unit 314 at the connection point estimates the state of the robot 10 at the connection point between the rear transition section and the next section in step S25. The estimation here is prediction of a future state. The connection point is the end point of the current base track. As an example, the state estimation unit 314 at the connection point estimates the state of the robot 10 at the connection point using the simulator 316. The simulator 316 predicts (estimates) the state of the robot at the connection point from the current state of the robot 10 and the information on the via-point of the base track up to the connection point.

In step S26, the state determination unit 313 at the connection point determines whether an error estimation value (error predicted value) between the predicted state and the state indicated by the base track is within an allowable range. The target for calculating the error and the allowable range of the error value are indicated in the allowable error field 522 of the transition section information. The type of error is defined for each transition section, and can be, for example, a position of a predetermined point of the article 4 or the hand 3, a speed or acceleration thereof, or an angle, an angular velocity, an angular acceleration, or the like from a reference posture of the article 4 or the hand 3. The point of predicting the error may be different from the connection point, and the prediction of the error may be executed before the transition section start point.

In a case where the error estimation value is within the allowable range (S26: YES), the flow returns to step S16. In a case where the error estimation value is outside the allowable range (S26: NO), in step S22, the state determination unit 313 at the connection point substitutes 1 for the variable STATUS. The flow returns to step S16.

When above-described steps S16 to S27 are executed for all the via-points of the target track, the robot 10 is positioned at the end point of the current base track, that is, the start point of the next base track. In step S28, the state determination unit 313 at the connection point determines whether an error with respect to the reference state of the current state is within an allowable range. The description in step S26 can be applied to the determination in this step.

In a case where the error is outside the allowable range (S28: NO), in step S29, the control unit 318 temporarily stops the robot 10 until the error falls within the predetermined range. In the temporary stop of the robot 10, the target via-point immediately before the temporary stop is continuously set as the next via-point. As a result, since the robot is controlled so as to approach the via-point, the error decreases, and unstable operation between the base tracks can be suppressed. After the error falls within the allowable range, the process transitions to the next base track processing. In a case where the error is within the allowable range (S28: YES), the robot is not temporarily stopped, and the process transitions to the next base track processing.

When the robot operation in all the base tracks is completed, the calculation unit 31 stores the current operation record data in the track record information 323 of the storage unit 32. The track record information 323 indicates information on the via-point of the actual track.

Figure 9:
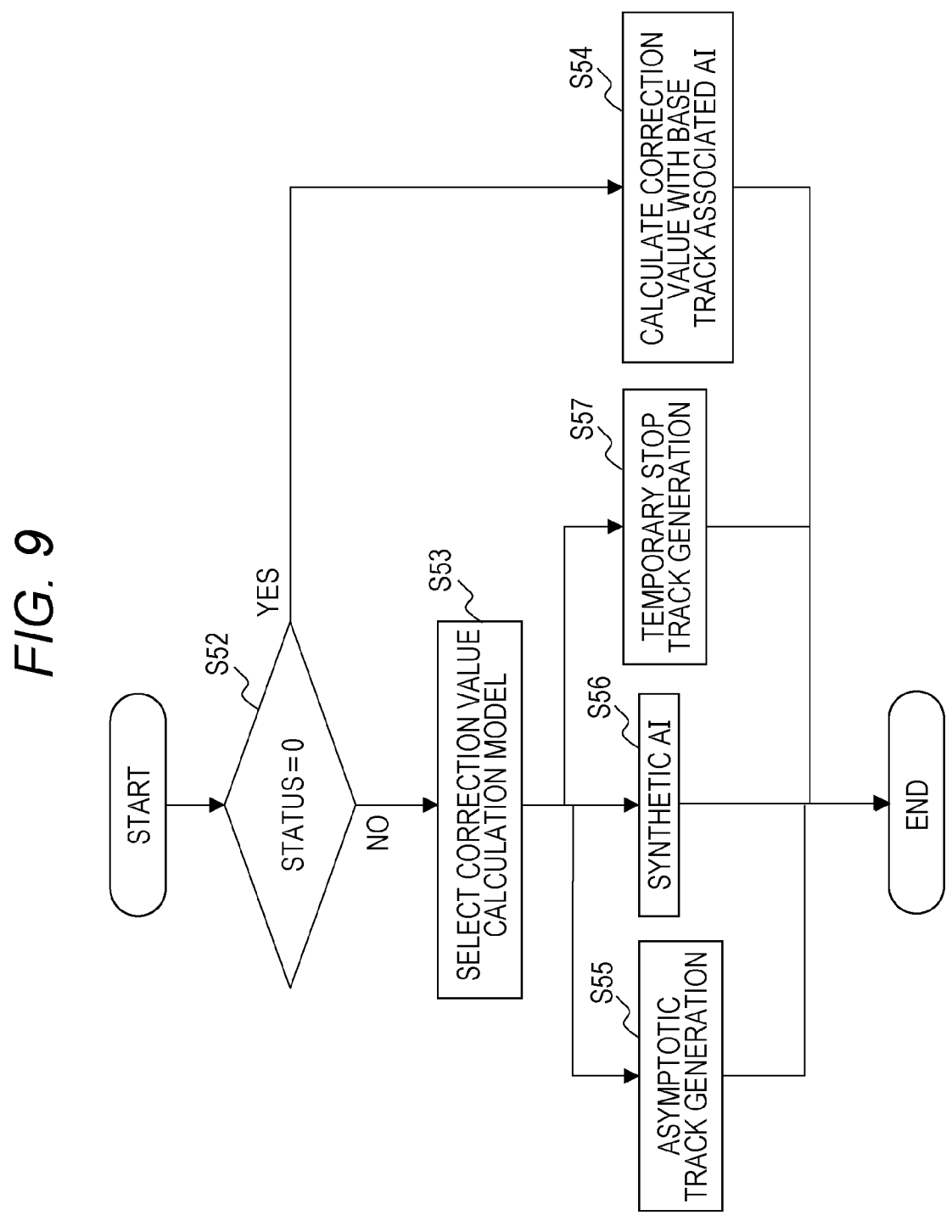
FIG. 9 illustrates a flowchart of an example of processing by a correction value calculation unit.

Next, calculation processing of the correction value by the correction value calculation unit 311 in step S22 in FIG. 8A will be described. FIG. 9 illustrates a flowchart of an example of processing by the correction value calculation unit 311. In step S52, the correction value calculation unit 311 checks whether the value of the variable STATUS is 1 or 0. When the value of the variable STATUS is 1, it means that the current via-point is within the transition section and the error at the connection point of the transition section is outside the allowable range. On the other hand, when the value of the variable STATUS is 0, it means that the current via-point is outside the transition section, or the current via-point is within the transition section, and the error at the connection point of the transition section is within the allowable range.

When the value of the variable STATUS is 0 (S52: YES), in step S54, the correction value calculation unit 311 selects an AI model associated with the base track in the base track information 321, that is, an AI model indicated by the AI name field 403, from the AI model group 315, and calculates the correction value by the AI model.

When the value of the variable STATUS is 1 (S52: NO), in step S53, the correction value calculation unit 311 selects a correction value calculation model corresponding to the transition section. The correction value calculation model of the transition section is designated by the transition section information 322. Examples of the designated correction value calculation model are an asymptotic track generation model, a synthetic AI model, or a temporary stop track generation model. In step S55, S56, or S57, the correction value calculation unit 311 calculates a correction value using any one of the correction value calculation models.

Hereinafter, examples of control in some transition sections will be described. The following description illustrates an example of control in the transition section, and control in various other transition sections can be implemented.

Figure 10:
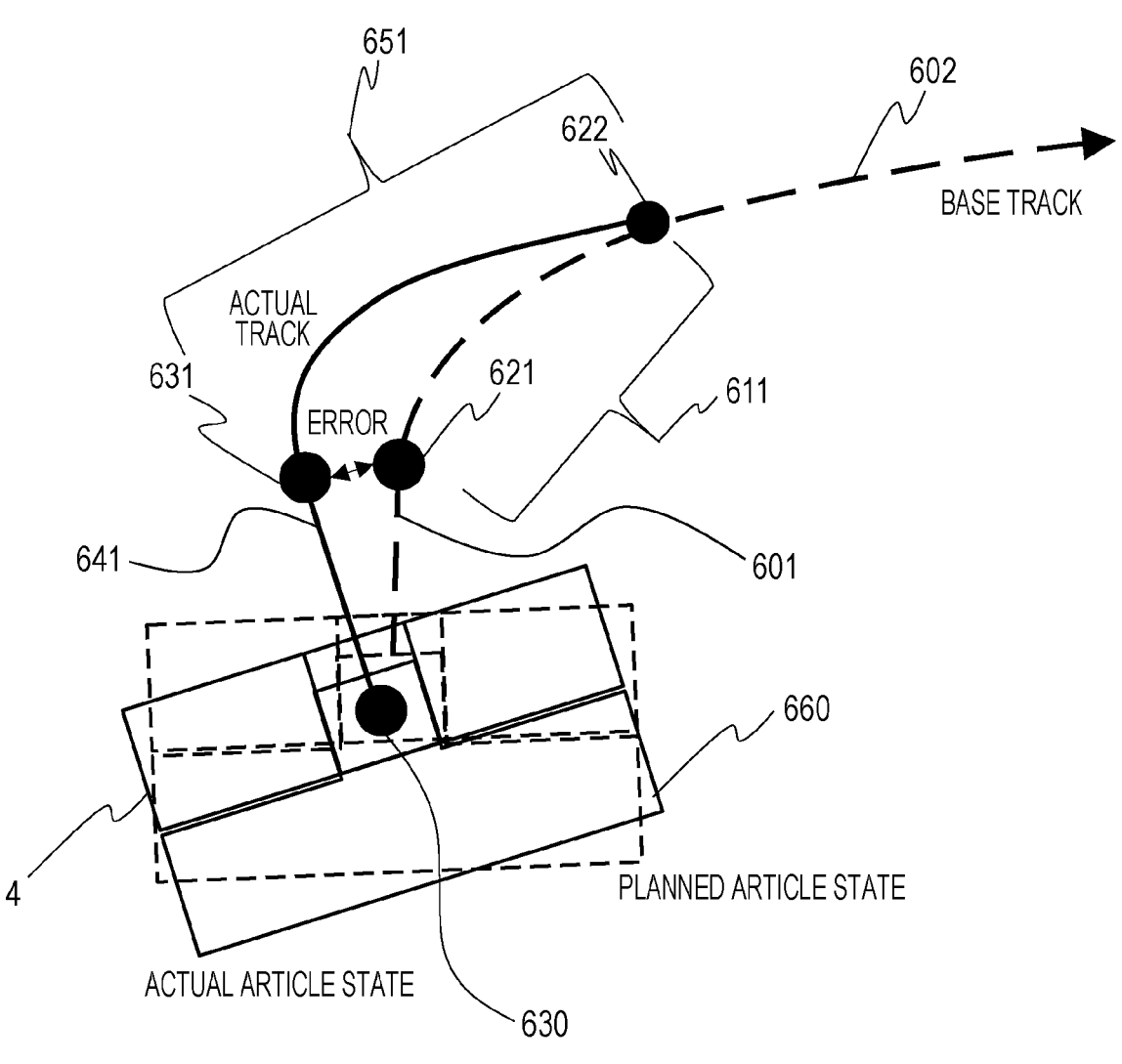
FIG. 10 illustrates an operation of pulling out an article inserted into a pin of a base from the pin and then conveying the article as an example of the operation of the robot.

FIG. 10 illustrates, as an example of the operation of the robot 10, an operation of extracting an article inserted into a pin of the base from the pin and then conveying the article. Prior to operation, the article 4 is positioned on a base 660 with pins of the base 660 inserted into holes in the article 4. Solid lines indicate the actual initial condition of the article 4 and the base 660, and dashed lines indicate their planned initial condition. The actual state of the article 4 and the base 660 is inclined with respect to the planned state.

Two base tracks 601 and 602 are defined. The base tracks 601 and 602 are indicated by dashed lines. For example, the track number of the base track 601 is 1, and the track number of the base track 602 is 2. A previous transition section 611 is defined with respect to the base track 602. The previous transition section 611 is a section from a via-point 621 to a via-point 622.

It is assumed that the calculation unit 31 of the control device 14 uses an AI model AI1 for the base track 601 and uses an AI model AI2 for the base track 602. The AI1 is a model optimized for extraction of the article 4, and the AI2 is an AI model optimized for conveyance of the article 4.

For example, the calculation unit 31 controls the robot 10 with an AI model optimized for extracting the article 4 straight from the pin in the base track 601. This control prioritizes the posture of the article 4. The calculation unit 31 controls the robot 10 with an AI model optimized for moving the article 4 fast while considering the centrifugal force applied to the article 4 in the next base track 602. This control prioritizes the position of the article 4. As a result of the control with the posture-prioritized AI model, when the AI model is switched to the next position-prioritized AI model in a state where the end point of the base track 601 is shifted from the base track, in order to eliminate the shift of the position, a rapid track change occurs, and the behavior of the robot 10 may become unstable.

In FIG. 10, an actual track 641 corresponding to the base track 601 is indicated by a solid line and is different from the base track 601. The base track 601 is a track from a start point 630 to the via-point 621, and the actual track 641 is a track from the start point 630 to a via-point 631. The calculation unit 31 determines the actual track 641 according to the AI1, the base track 601, and the state of the article 4. Since the actual initial state of the article 4 is inclined with respect to the planned initial state, the base track 601 and the actual track 641 are different.

The end point 631 (via-point) of the actual track 641 corresponds to the end point 621 of the base track 601. The end point 621 is a start point (connection point) of the transition section 611. There is an error between the via-point 631 and the corresponding via-point 621 of the base track, and in this example, this error is outside the allowable range. Therefore, the calculation unit 31 uses the correction value calculation model set in advance for the transition section 611 in the section corresponding to the transition section 611.

In the example illustrated in FIG. 10, the calculation unit 31 uses an asymptotic model that calculates a correction value asymptotically approaching the base track. The asymptotic model calculates a correction value for the next via-point by using, for example, the current actual via-point, the next via-point in the base track 602, and the end point

622 of the transition section 611 as inputs. The robot 10 operates from the via-point 631 to the via-point 622 on an actual track 651. After the via-point 622, the calculation unit 31 calculates the correction value using the AI2 associated with the base track 602.

In the robot control of the present example, the control model can be switched without temporarily stopping the robot 10. Therefore, a delay in the work of the robot 10 can be suppressed. Note that the robot 10 may be temporarily stopped at the time of switching the control model as in an example described later with reference to FIG. 12.

Figure 11:
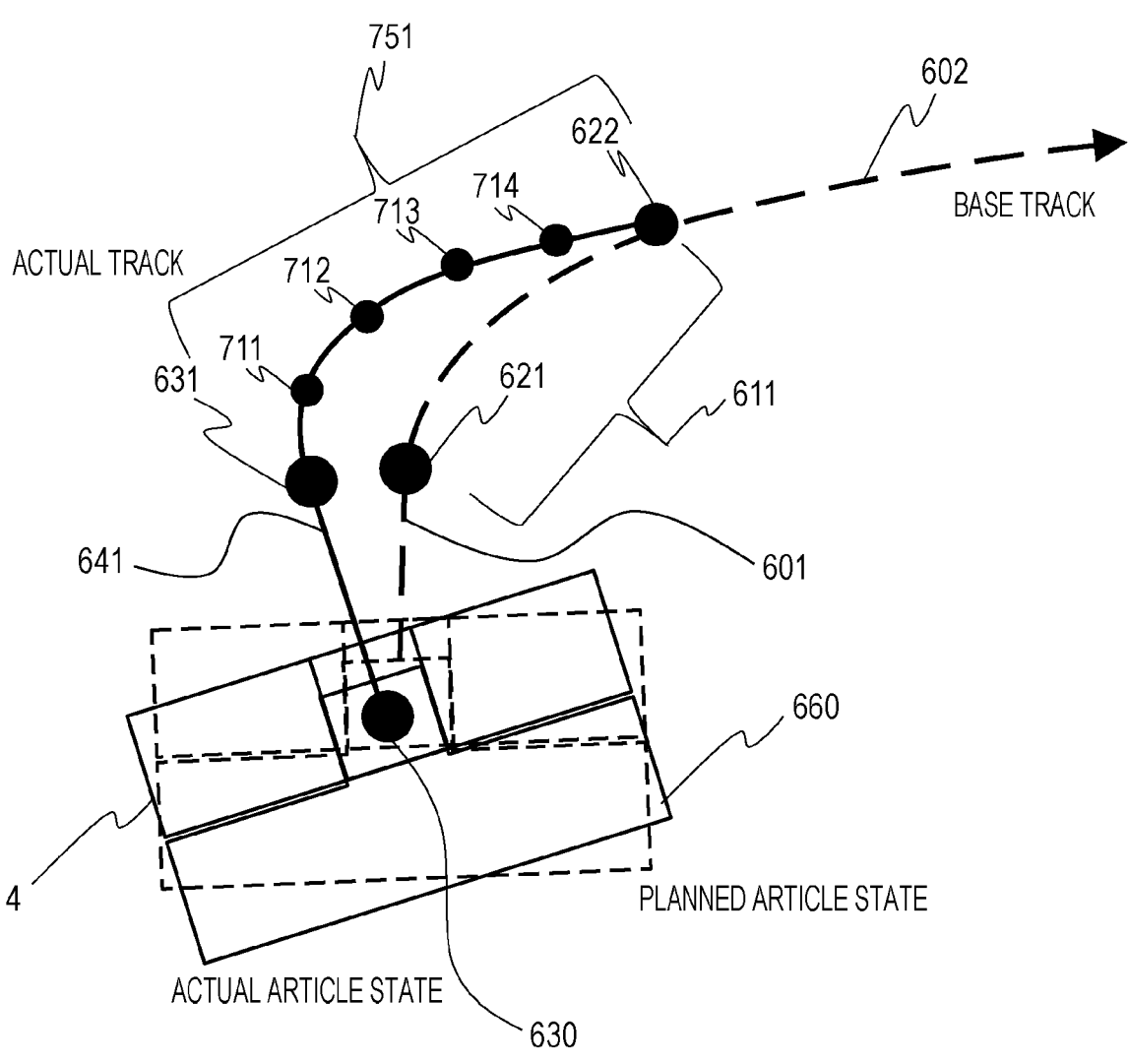
FIG. 11 illustrates an operation of pulling out an article inserted into a pin of a base from the pin and then conveying the article as an example of the operation of the robot.

Next, another example of control in the transition section will be described. FIG. 11 illustrates, as an example of the operation of the robot 10, an operation of extracting an article inserted into a pin of the base from the pin and then conveying the article. The example illustrated in FIG. 11 is similar to the example illustrated in FIG. 10 except for the method of calculating the correction value in the transition section. Hereinafter, differences from the example illustrated in FIG. 10 will be mainly described.

In the example illustrated in FIG. 11, the calculation unit 31 uses the synthetic AI model for calculation of the correction value in the transition section. In the present example, the calculation unit 31 generates a synthetic model AI3 from the AI1 for the base track 601 and the AI2 for the base track 602. As a result, the unstable operation of the robot 10 can be suppressed.

In one example, the calculation unit 31 divides the transition section 611 into N sections, and determines AI3 to be used in the section of the actual track corresponding to each of the divided sections on the basis of the following equation.

$$AI3\_n = AI1 * n/N + AI2 * (N - n)/N$$

AI3_$n$ is an AI model used n-th in the transition section. AI1 is an AI model of the base track 601, and AI2 is an AI model of the base track 602. N is a natural number, and n is a natural number of N or less. In FIG. 11, for example, the calculation unit 31 uses AI3_1 between the via-points 631 to 711 and switches the use model to AI3_2 at the via-point 712. Thereafter, the calculation unit 31 switches the use model to AI3_3 and AI3_4 at respective via-points 713 and 714.

For example, the calculation unit 31 proportionally divides the values of the weights in the neural networks constituting AI1 and AI2 by the above equation. It is assumed that the network configurations of AI1 and AI2 are common, and only the weight values are different. In another example, the calculation unit 31 proportionally divides the correction values output from the two models AI1 and AI2 according to the above equation.

Figure 12:
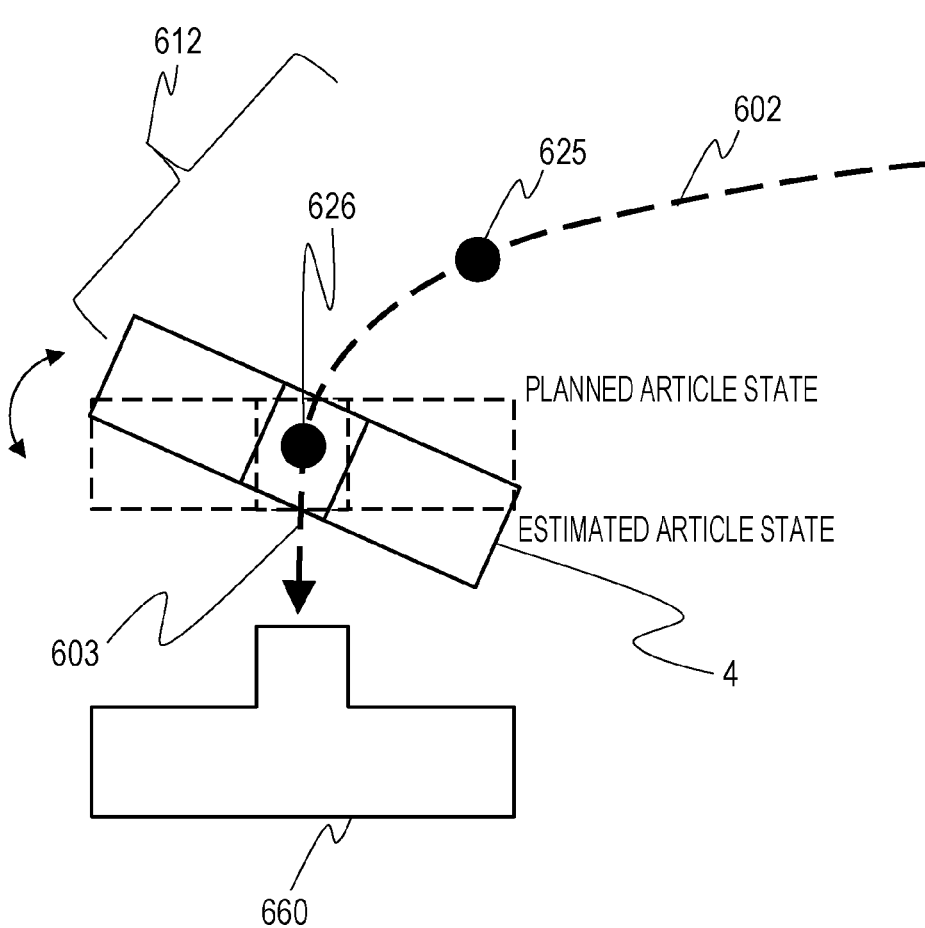
FIG. 12 illustrates an operation of conveying an article and inserting the article into a pin of a base as an example of the operation of the robot.

Next, another example of control in the transition section will be described. FIG. 12 illustrates an operation of conveying the article 4 and inserting the article 4 into the pin of the base 660 as an example of the operation of the robot 10. A hole is formed in the article 4, and the article 4 is inserted into the pin so that the pin fits into the hole.

Two base tracks 602 and 603 are defined. The base tracks 602 and 603 are indicated by dashed lines. For example, the track number of the base track 602 is 2, and the track number of the base track 603 is 3. A rear transition section 612 is defined with respect to the base track 602. The rear transition section 612 is a section from a via-point 625 to a via-point 626. The via-point 626 is a connection point of the base tracks 602 and 603.

It is assumed that the calculation unit 31 of the control device 14 uses AI2 for the base track 603 and uses an AI model AI4 for the base track 603. The AI2 is an AI model optimized for conveyance of the article 4, and the AI4 is a model optimized for insertion of the article 4 into the pin of the base 660.

For example, the calculation unit 31 controls the robot 10 with an AI model optimized for moving the article 4 fast while considering the centrifugal force applied to the article 4 in the base track 602. This control prioritizes the position of the article 4. The calculation unit 31 controls the robot 10 with an AI model optimized for inserting the article 4 straight into the pin on the base track 603. This control prioritizes the posture of the article 4.

As a result of the control with the position-prioritized AI model, the article 4 can be greatly inclined when the connection point of the base tracks 602 and 603 is reached. As a result, the position and posture control of AI4 of the base track 603 causes the robot 10 to operate so as to greatly swing the article 4, and the robot operation can become unstable. In this state, when the insertion operation is performed with the next AI model, the article 4 can collide with the base 660. In this manner, an unstable operation of the robot 10 can occur at the time of switching the AI model.

The calculation unit 31 estimates the state of the robot 10 at the via-point corresponding to the connection point 626 with the next base track 603 at the actual via-point (not illustrated) corresponding to the start point 625 of the rear transition section 612. As described with reference to FIG. 8B, the calculation unit 31 can estimate the state of the robot 10 using the simulator 316.

Furthermore, the calculation unit 31 compares the error between the estimated state and the connection point 626 (planned state) of the base track with an error range designated in advance in the transition section information 322. Here, the designation error may be, for example, an angle, an angular velocity, or an angular acceleration of the article 4. The calculation unit 31 holds information for controlling the robot 10 so as to change each of the posture and the position of the article 4.

If the estimation error is within the error range, the calculation unit 31 controls the robot 10 using AI2 of the base track 602. If the estimation error is outside the error range, the calculation unit 31 controls the robot 10 using the model set for the rear transition section 612. Here, the calculation unit 31 uses a model that temporarily stops at a point corresponding to the connection point 626. The calculation unit 31 continues to set the target via-point immediately before the temporary stop as the next via-point. As a result, the calculation unit 31 controls the robot 10 to approach the via-point. As a result, the posture change of the article 4 can be settled.

The calculation unit 31 confirms that the current state of the temporarily stopped robot 10 is within the allowable error range, releases the temporary stop, and starts robot control on the next base track 603. The control model used is AI4 designated for the base track 603.

With the processing example described with reference to FIGS. 10 to 12, it is possible to suppress the unstable operation at the time of switching the control model. The robot control of the present disclosure is not limited to operations such as extraction of an article, conveyance of an article, and insertion of an article by a six-axis robot as in the above example, and can be applied to various operations of various robots, for example, screw fastening, and extraction and installation of an article from a box or a shelf. The control model used in the transition section is not limited to the above example. For example, in the example with reference to FIG. 12, the position change is temporarily stopped and the posture change is settled, but in other examples, the position change and the posture change can have an opposite relationship.

FIG. 13 illustrates an example of a setting screen of a transition section. The setting screen can be displayed on, for example, a display device of the work instruction device 12 or a display device of a user terminal that accesses the work instruction device 12 via a network. In the example of the setting screen illustrated in FIG. 13, the user can input information to the transition section to set the transition section in the control device 14, and can confirm the planned track (base track) and the actual track of the robot 10.

In FIG. 13, a designated parameter table 810 is a table for the user to input the setting of the information of the transition section. The designated parameter table 810 has the same configuration as the transition section information 322 illustrated in FIG. 6.

A result table 830 indicates information on the operation in the transition section in the actual operation of the robot 10. In the example illustrated in FIG. 13, information such as a predicted value and a measured value of the error in the transition section and a pause time in pause control is illustrated. An image 850 illustrates a planned track (base track) and a track in actual operation of the robot 10. The numbers 1 to 3 indicate the track numbers of the base tracks, respectively.

Note that the present invention is not limited to the above-described embodiments, and includes various modifications. For example, the above-described embodiments have been described in detail for better understanding of the present invention, and are not necessarily limited to those having all the configurations of the description. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment.

Further, each of the configurations, functions, processing units, processing means, etc. described above may be implemented by hardware, for example, by designing part or all of them with an integrated circuit. In addition, each of the above-described configurations, functions, and the like may be implemented by software by a processor interpreting and executing a program for implementing each function. Information such as a program, a table, and a file for implementing each function can be stored in a storage device such as a nonvolatile semiconductor memory, a hard disk drive, and a solid state drive (SSD), or a computer-readable non-transitory data storage medium such as an IC card, an SD card, and a DVD.

Further, control lines and information lines indicate what is considered to be necessary for the description, and not all control lines and information lines in the product are necessarily shown. In practice, almost all configurations may be considered to be mutually connected.

What is claimed is:

1. A control device of an automatic machine, the control device comprising:

one or more processors; and one or more storage devices, wherein the one or more storage devices store base track information for managing a base track, and transition section information for managing a transition section, the base track information includes information of each of a first base track and a second base track that are continuous, the base track information designates a first machine learning model set with respect to the first base track, the base track information designates a second machine learning model set with respect to the second base track, the transition section information designates a first transition control method of the automatic machine in a first transition section different from control by the first machine learning model, the first transition section is set in the first base track and includes a connection point between the first base track and the second base track, and the one or more processors determine whether an actual track or a predicted track of the automatic machine at a predetermined point is within a preset error range, control the automatic machine using the first machine learning model in the transition section when the actual track or the predicted track is within the error range, and control the automatic machine by the first transition control method in the transition section when the actual track or the predicted track is outside the error range.

2. The control device according to claim 1, wherein the first transition control method temporarily stops the automatic machine.

3. The control device according to claim 2, wherein the second base track is a base track after the first base track, the predetermined point is the connection point, and the one or more processors determine whether the predicted track at the predetermined point is within the preset error range at a start point of the transition section.

4. The control device according to claim 1, wherein the first transition control method controls the automatic machine so as to asymptotically approach the connection point between the first base track and the second base track.

5. The control device according to claim 1, wherein the first transition control method controls the automatic machine using a model generated from the first machine learning model and the second machine learning model.

6. The control device according to claim 4, wherein the second base track is a base track before the first base track, the predetermined point is the connection point, and the one or more processors determine whether the actual track at the connection point is within the preset error range.

7. The control device according to claim 5, wherein the second base track is a base track before the first base track, the predetermined point is the connection point, and the one or more processors determine whether the actual track at the connection point is within the preset error range.

8. A control method of an automatic machine by a control device, in which the control device stores base track information for managing a base track, and transition section information for managing a transition section, the base track information includes information of each of a first base track and a second base track that are continuous, the base track information designates a first machine learning model set with respect to the first base track, the base track information designates a second machine learning model set with respect to the second base track, the transition section information designates a first transition control method of the automatic machine in a first transition section different from control by the first machine learning model, and the first transition section is set in the first base track and includes a connection point between the first base track and the second base track, the control method comprising: by the control device, determining whether an actual track or a predicted track of the automatic machine at a predetermined point is within a preset error range;

controlling the automatic machine using the first machine learning model in the transition section when the actual track or the predicted track is within the error range; and controlling the automatic machine by the first transition control method in the transition section when the actual track or the predicted track is outside the error range.

\* \* \* \* \*